US011550780B2

(12) United States Patent
Hillman

(10) Patent No.: US 11,550,780 B2
(45) Date of Patent: Jan. 10, 2023

(54) PRE-CONSTRUCTED QUERY RECOMMENDATIONS FOR DATA ANALYTICS

(71) Applicant: Google LLC, Mountain View, CA (US)

(72) Inventor: Aryeh Hillman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/066,439

(22) Filed: Oct. 8, 2020

(65) Prior Publication Data

US 2022/0114169 A1 Apr. 14, 2022

(51) Int. Cl.
*G06F 16/242* (2019.01)
*G06F 16/28* (2019.01)
*G06F 16/25* (2019.01)

(52) U.S. Cl.
CPC ...... *G06F 16/2423* (2019.01); *G06F 16/2443* (2019.01); *G06F 16/2445* (2019.01); *G06F 16/252* (2019.01); *G06F 16/285* (2019.01)

(58) Field of Classification Search
CPC ............ G06F 16/2423; G06F 16/2443; G06F 16/285; G06F 16/2445; G06F 16/252
See application file for complete search history.

(56) References Cited

U.S. PATENT DOCUMENTS 11,163,755 B2 * 11/2021 Jacob ................ G06F 16/24542
2012/0290620 A1 * 11/2012 Guan .................... G06F 16/242
707/779

(Continued)

FOREIGN PATENT DOCUMENTS

EP 3640818 A1 4/2020

OTHER PUBLICATIONS

Chatzopoulou Gloria et al, "Query Recommendations for Interactive Database Exploration", Jun. 2, 2009 (Jun. 2, 2009), Advances in Biometrics : International Conference, ICB 2007, Seoul, Korea, Aug. 27-29, 2007 ; Proceedings; [Lecture Notes in Computer Science; Lect.Notes Computer], Springer, Berlin, Heidelberg, pp. 3-18, XP047380912, ISBN: 9783540745495.

(Continued)

*Primary Examiner* — Mark D Featherstone
*Assistant Examiner* — Ranjit P Doraiswamy
(74) *Attorney, Agent, or Firm* — Honigman LLP; Brett A. Krueger; Grant Griffith

(57) ABSTRACT

A process for recommending pre-constructed queries in data analytics includes writing different records to a correlation data structure correlating different data classifications of data to different queries and, subsequent to the writing, establishing a communicative connection by a data analytics application to an underlying database. Thereafter, a data model for data in the database may be constructed in the data analytics application and at least one of the different queries may be selected in the correlation data structure that correlates to the classification of the data in the data model. Finally, the selected one of the different queries may be displayed in the data analytics application to an end user so as to provide an intelligent recommendation for the addition of the selected one of the different queries without requiring the end user to alone and without assistance discover the suitability of the selected one of the different queries.

20 Claims, 3 Drawing Sheets

(56) References Cited

U.S. PATENT DOCUMENTS

2016/0378867 A1     12/2016   Panuganty
2020/0409919 A1*   12/2020   Zhang .................... G06N 5/022

OTHER PUBLICATIONS

Abouzied Azza et al, "Playful query specification with DataPlay", New York, NY Aug. 1, 2012 (Aug. 1, 2012), vol. 5, No. 12, p. 1938-1941, Retrieved from the Internet: URL:https://dl.acm.org/doi/pdf/10.14778/2367502.2367542. XP055894291, DOI: 10.14778/2367502.2367542 external link, ISSN:2150-8097.
Sellam Thibault et al, "Cluster-Driven Navigation of the Query Space", May 1, 2016 (May 1, 2016), vol. 28, No. 5, p. 1118-1131, XP011604937, DOI: 10.1109/TKDE.2016.2515590 external link, ISSN:1041-4347.
Mar. 3, 2022 Written Opinion (WO) of the International Searching Authority (ISA) and International Search Report (ISR) issued in International Application No. PCT/US2021/053845.

\* cited by examiner

PRE-CONSTRUCTED QUERY RECOMMENDATIONS FOR DATA ANALYTICS

TECHNICAL FIELD

The present disclosure relates to the field of data analytics and business intelligence (BI) and more particularly to the formulation of queries for BI in a data analytics system.

BACKGROUND

The term database refers to an organized collection of data, stored and accessed electronically by way of a computing system A database management system (DBMS) in turn is a computer program that provides an interface between the database and one or more end users so as to facilitate the interaction by each end user with the database A DBMS generally also provides an interface to other computer programs to access the data in the underlying database Generally speaking, end users and other computer programs interact with the database through the DBMS using query directives formed in conformance with a corresponding query language such as the venerable structured query language (SQL).

While the very basic use of SQL to query and manage data in a database is of no great difficulty for many end users, formulating more complex SQL queries is not for the faint of heart. More importantly, specifying a query irrespective of the mechanics of the actual query requires a strong understanding of the data in the database and the underlying relationships between the data. To the extent that "reading" the content of a database is not practical, it is known to model a database so that the created database model can then be introspected so as to afford a deeper understanding of the data in the database. Indeed, modem data analytics tools permit not only the modeling of an existing database, but also the formulation of SQL queries to be executed against the database based upon knowledge only supplied by the model.

In this regard, a data model is an abstract model that describes how a data set of a database is organized and guides the construction of queries with respect to the data of the data set. The data model generally contains a join graph whose vertices each reference a table and whose edges reflect join conditions between references to the tables. As well, the join graph may also describe the columns in those tables, columns that are derived from other columns via expressions, collections of columns by which queries are typically sorted, collections of columns by which queries are typically grouped into sub-totals and totals, expressions that are derived by combining column values during the construction of a sub-total or total, and other suggestions for how queries might be formed on the data.

Despite the robust nature of a data model, the introspection of a data model for a database, however, is not alone sufficient to enjoy a complete understanding of the data in a database. In fact, automated database modeling tools generally only are able to produce a database model explicitly mapping to the underlying database including queries previously defined in the model as previously executed against the database through the DBMS for the database. However, so much implicit information remains undiscovered that otherwise might be inferred from the existing data in the database, but which has not yet been explicitly defined.

Despite is natural consequence of data analytics, in which different real-world questions regarding the data collected for a business are answered utilizing data analytics so as to provide "actionable insights" into the nature, operation and performance of a business. These real-world questions are asked in the form of one or more queries to the data model that are not already present in the model, but which are inferred from the data model. Modem BI tools not only provide some stock forms of these queries, but also provide a programmatic interface which permits the end user to formulate custom query blocks to answer those real-world questions of specific interest to the end user. Yet, mastering the skill set necessary to create a block of queries sufficient to achieve the "actionable insights" sought is no small feat and often is not feasible for some end users.

SUMMARY

Examples of the present disclosure address deficiencies of the art in respect to query block customization of a BI tool and provide a novel and non-obvious method, system, and computer program product for recommending pre-constructed queries in data analytics. One aspect of the disclosure provides a method for recommending pre-constructed queries in data analytics. The method includes writing different records to a correlation data structure correlating different data classifications of data to different queries. The method also includes, subsequent to the writing, establishing a communicative connection by a data analytics application to an underlying database from over a computer communications network. The method further includes constructing in the data analytics application, a data model for data in the database and classifying the data in the data model. The method also includes selecting in the correlation data structure, at least one of the different queries correlated to the classification of the data in the data model. The method further includes displaying in the data analytics application, the selected one of the different queries.

Implementations of the disclosure may include one or more of the following optional features. In some examples, the displaying includes displaying a set of directives corresponding to the selected one of the queries. Here, the directives may be markup language statements.

In some implementations, the selection in the correlation data structure, includes a selection of at least one of the different queries correlated to a combination of classifications of data in the data model, in some configurations, the selection in the correlation data structure includes a selection of a user interface view that is a visualization of a portion of the data model. In some examples, the selection in the correlation data structure includes a selection of a report of data from a portion of the data model. In some configurations, the selection in the correlation data structure includes a selection of a programmatic directive in a third-party application.

Another aspect of the disclosure provides a data analytics data processing system configured for recommending pre-constructed queries. The system includes a host computing platform comprising one or more computers, each with memory and at least one processor. The system also includes a database storing therein data and a data analytics computer program executing in the memory and managing queries against a data model modeling the data in the database. The system further includes a pre-constructed query recommendation module comprising computer program instructions enabled during execution in the memory of the host computing platform to perform operations One of the operations includes writing different records to a correlation data structure correlating different data classifications of data to different queries. Another operation includes, subsequent to the writing, establishing a communicative connection by a data analytics application to an underlying database front over a computer communications network. The operations also include constructing in the data analytics application, a data model for data in the database and classifying the data in the data model Another operation includes selecting in the correlation data structure, at least one of the different queries correlated to the classification of the data in the data model. The operations further include displaying in the data analytics application, the selected one of the different queries.

Implementations of the disclosure may include one or more of the following optional features. In some examples, the displaying includes displaying a set of markup language statements corresponding to the selected one of die queries. In some implementations, the selection in the correlation data structure includes a selection of at least one of the different queries correlated to a combination of classifications of data in the data model.

In some examples, the selection in the correlation data structure includes a selection of a user interface view that is a visualization of a portion of the data mode. Optionally, the selection in the correlation data structure includes a selection of a report of data from a portion of the data model. In some configurations, the selection in the correlation dam structure includes a selection of a programmatic directive in a third-party application.

Another aspect of the disclosure provides a computer program product for recommending pre-constructed queries in data analytics. The computer program product includes a computer readable storage medium having program instructions included therewith. The program instructions are executable by a device to cause the device to perform a method including writing different records to a correlation data structure correlating different data classifications of data to different queries. The method further includes, subsequent to the writing, establishing a communicative connection by a data analytics application to an underlying database from over a computer communications network. The method also includes constructing in the data analytics application, a data model for data in the database and classifying the data in the data model. The method also includes selecting in the correlation data structure, at least one of the different queries correlated to the classification of the data in the data model. The method also includes displaying in the data analytics application, the selected one of the different queries.

Implementations of the disclosure may include one or more of the following optional features. In some configurations, the displaying includes displaying a set of directives corresponding to the selected one of the queries. In some examples, the directives are markup language statements. In some implementations the selection in the correlation data structure, includes a selection of at least one of the different queries correlated to a combination of classifications of data in the data model.

In some configurations, the selection in the correlation data structure includes a selection of a user interface view that is a visualization of a portion of the data model. In some examples, the selection in the correlation data structure includes a selection of a report of data from a portion of the data model. In some configurations the selection in the correlation data structure includes a selection of a programmatic directive in a third-party application.

The details of one or more implementations of the disclosure are set forth in the accompanying drawings and the description below Other aspects, features, and advantages will be apparent from the description and drawings, and from the claims.

DESCRIPTION OF THE DRAWINGS

The accompanying drawings, which are incorporated in and constitute pan of this specification, illustrate examples of the disclosure and together with the description, serve to explain the principles of the disclosure. The examples illustrated herein are presently preferred, it being understood, however, that the disclosure is not limited to the precise arrangements and instrumentalities shown, wherein.

Like reference symbols in the various drawings indicate like elements.

DETAILED DESCRIPTION

Examples of the disclosure provide for recommending pre-constructed queries in data analytics. In accordance with an example of the disclosure, data in different data models for different databases may be classified according to one or more classifications such as data type. Each of the classifications of corresponding classified data in the data model may then be associated in a correlation table with one or more different data model queries or query blocks established for the classified data. Thereafter, a data analytics application establishes a communicative connection to an underlying database from over a computer communications network and constructs a data model for data in the database. As well, the data analytics application classifies the data in the data model Consequently, the data analytics application may then select in the correlation data structure at least one of the different queries correlated to the classification of the data in the data model so as to display in the data analytics application to an end user, an intelligent recommendation for adding the selected one of the different queries to a set of queries to be executed against the data in the data model.

Figure 1:
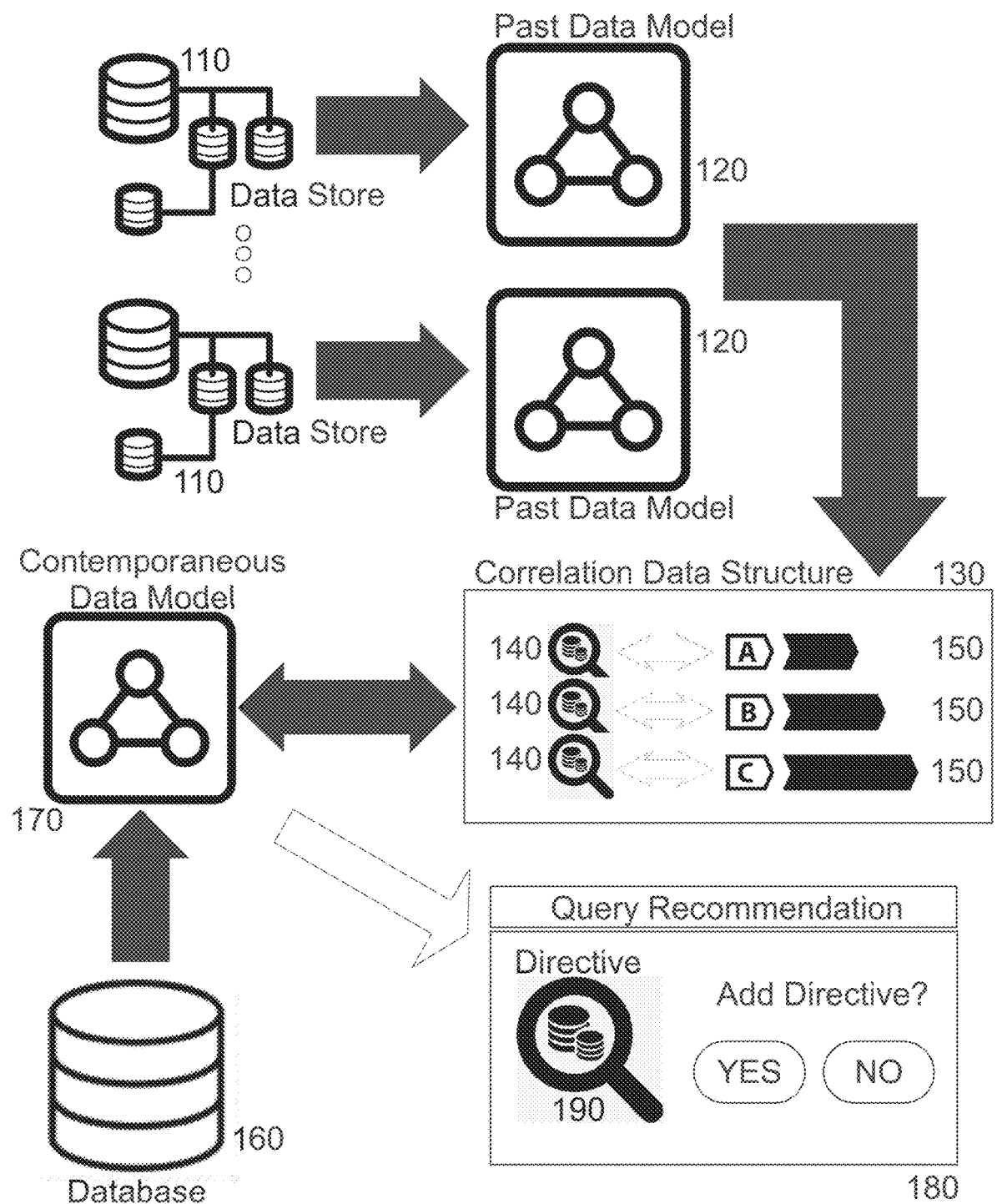
FIG. 1 is pictorial illustration of a process for recommending pre-constructed queries in data analytics.

In further illustration, FIG. 1 pictorially shows a process for recommending pre-constructed queries in data analytics. As shown in FIG. 1, each directive 140 applied in connection with data in a different one of data models 120 produced from a corresponding data store 110 may be correlated with a characterization 150 of the data, such as data type of the data, or class of the data in terms of to which topic the data relates, or a source of the data in terms of which portion of an organization produced the data, to name only a few examples. Each directive 140, in turn, can be a simple query, a complex query, a set of queries, markup language representative of one or more queries, e.g. a query block, a user interface view that is a visualization of a portion of corresponding one of the data models 120, a report of data from a portion of a corresponding one of the data models 120, or a programmatic directive in a third-party application.

The correlations are then stored in a correlation data structure 130 such as a table, list or flat file document, to name three examples. Thereafter, with respect to a contemporaneous data model 170 generated from a database 160, the data in the data model 170 may be characterized for cross-reference with the characterizations 150 of the correlation data structure 130 in order to identify a matching entry in the correlation data structure 130. By matching, while a complete match may be preferred, it is to be recognized that a partial match beyond a threshold amount may be considered matching. In particular, to the extent that a combination of data each of different classification partially matches a single entry in die correlation data structure 130 which entry consists of a combination of characterizations of data specified in connection with a previously asserted directive, a threshold number of matching characterizations may be considered matching.

In any event, corresponding directive 190 for the matching entry may then be retrieved and subsequently proposed for use in respect to the contemporaneous data model 170 in a user interface prompt 180 of a Bf tool. In this way, one or more customized enhancements to the BI tool may be discovered on behalf of the end user so as to achieve the desired "actionable insights" into the data model 170 without requiring the end user to master the skill set necessary to create a block of queries sufficient to achieve such "actionable insights".

Figure 2:
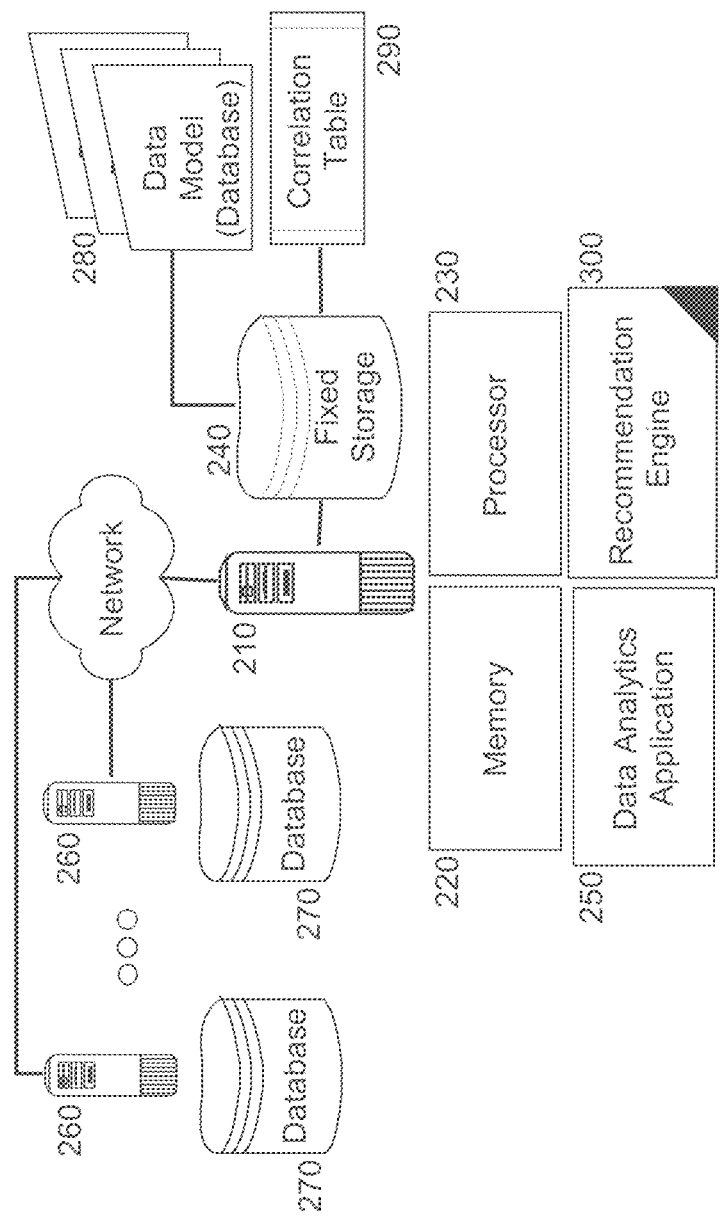
FIG. 2 is a schematic illustration of a data analytics data processing system configured for recommending pre-constructed queries.

The process described in connection with FIG. 1 may be implemented in a data analytics data processing system. In further illustration, FIG. 2 schematically shows a data analytics data processing system configured for recommending pre-constructed queries. The system includes a host computing platform 210 that includes one or more computers each with memory 220 and at least one processor 230. The host computing platform 210 includes fixed storage 240 and is coupled to different remote computing devices 260 from over computer communications network 200, each with its own database 270. A data analytics application 250 executes within the host computing platform 210 and provides a user interface to conduct data analytics operations against different data models 280 stored within the fixed storage 240 of the host computing platform 210. Finally, the system includes a recommendation engine module 300 coupled to the data analytics application 250.

The recommendation engine module 300 includes computer program instructions that, when executing in the memory 220 of the host computing platform 210, are enabled to monitor directives issued against the data models 280. The program instructions are further enabled to identify, for each of the directives, data implicated by the corresponding directive. The program instructions yet further are enabled to characterize the data and to create a record for each directive in a correlation table 290 correlating the directive with the corresponding characterization or a corresponding combination of characterizations of multiple data implicated by the directive.

Finally, the program instructions are enabled to process a newly generated one of the data models 280 for a corresponding one of the databases 270 by characterizing the data in the newly generated one of the data models 280, and also combinations of the data in the newly generated one of the data models 280, and to locate in the correlation table 290 matching entries for selected ones of the characterizations. For each matching entry in the correlation table, the program instructions are enabled to retrieve a corresponding directive and to present a user interface prompt in the data analytics application 250 to add the corresponding directive as an enhancement to the data analytics application 250.

Figure 3B:
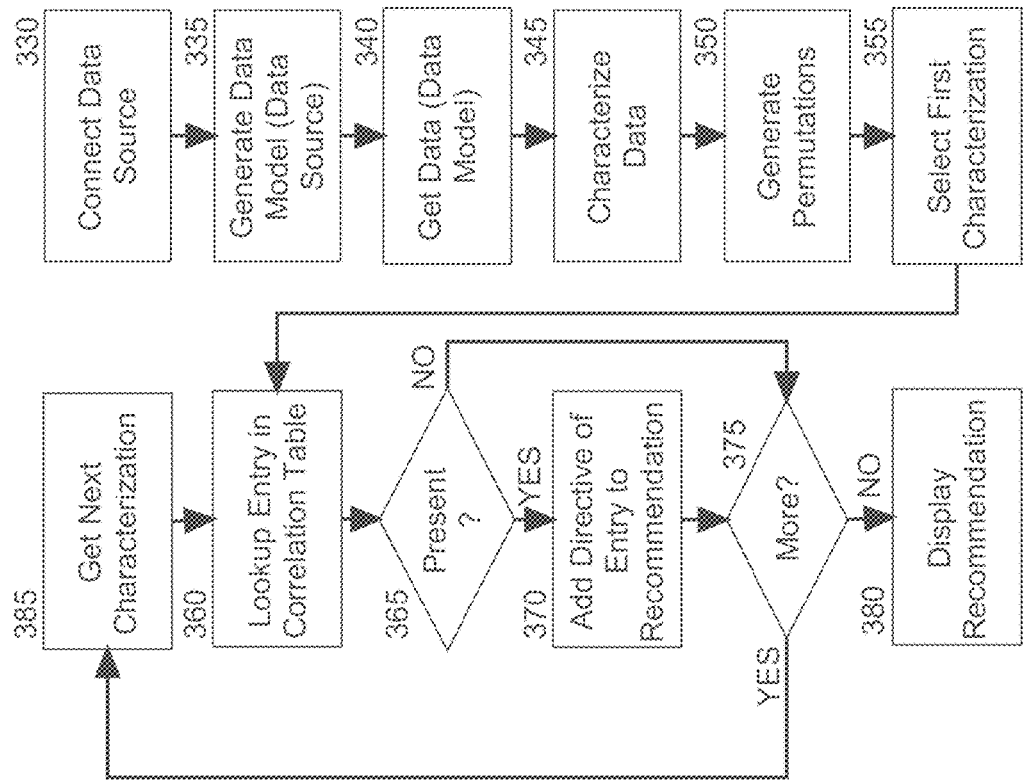
FIGS. 3A and 3B, taken together, are a flow chart illustrating a process for recommending pre-constructed queries in data analytics.
Figure 3A:
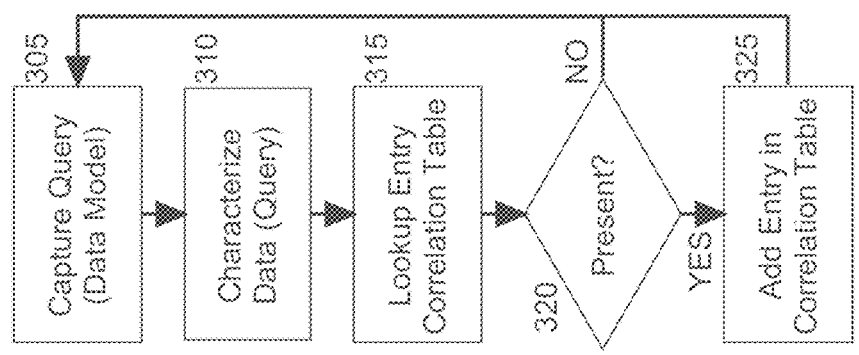

In even yet further illustration of the operation of the recommendation engine module 300, FIGS. 3A and 3B, taken together, are a flow chart illustrating a process for recommending pre-constructed queries in data analytics.

Beginning in block 305, a query issued against a data model may be captured for analysis and in block 310, the data implicated by the query may be characterized, for instance according to data type or class of data, or source of data. Then, in block 315 the correlation table may be inspected to determine whether or not an entry already exists in the correlation table for the characterization. In decision block 320, if it is determined that an entry does not already exist in the correlation table for the characterization, in block 325 an entry is added to the correlation table for the characterization correlating the characterization to the directive. The process then repeats for the next monitored query.

Turning now to FIG. 3B, in block 330 a connection can be established between the data analytics application and a new data source front which a data model may then be generated in block 335. Then, in block 340 data front the data model may be retrieved for processing and in block 345, characterized, either individually by column, or as a permutation of column headings in block 350. Thereafter, in block 355, a first characterization may be selected and in block 360, the correlation table may be inspected for a matching entry. In decision block 365, if a matching entry can be found, in block 370, a corresponding directive for the matching entry may be added to a list of recommendations. In decision block 375, if additional characterizations remain to be processed, in block 385 a next characterization may be retrieved and the process continues through block 360. When no further characterizations remain in decision block 375, the recommendations in the list may be presented in a user interface dialog as suggested enhancements to the data analytics application.

The present disclosure may be included within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network lire computer readable program instructions may execute entirely on the user's computer, partly on the user's computer, as a stand-alone software package, partly on the user's computer and partly on a remote computer or entirely on the remote computer or server Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flow-chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow-chart and/or block diagram block or blocks.

The flowchart and block diagrams in the figures illustrate the architecture, functionality, and operation of possible implementations of systems, methods, and computer program products according to various examples of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block-diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but, is not intended to be exhaustive or limited to the disclosure in the form disclosed. Many modifications and variations will be apparent to those of ordinary skill in the art without departing from the scope and spirit of the disclosure. The example was chosen and described in order to best explain the principles of the disclosure and the practical application, and to enable others of ordinary skill in the art to understand the disclosure for various examples with various modifications as are suited to the particular use contemplated.

A number of implementations have been described Nevertheless, it will be understood that various modifications may be made without departing from the spirit and scope of the disclosure. Accordingly, other implementations are within the scope of the following claims.

What is claimed is:

1. A computer-implemented method for recommending pre-constructed queries in data analytics, the method executed by data processing hardware that causes the data processing hardware to perform operations comprising:
   obtaining a plurality of different pre-constructed queries, each query of the plurality of different pre-constructed queries querying respective data from a respective database;
   for each respective pre-constructed query of the plurality of pre-constructed different queries:
      determining a respective classification of the respective data queried from the respective database, the respective classification of the respective queried data representing one or more of a type, a class, or a source for the respective queried data;
      determining a respective correlation of the respective query with the respective classification of the respective queried data; and
      adding, to a correlation data structure, the respective correlation between the respective pre-constructed query and the respective classification of the respective queried data;
   establishing a communicative connection by a data analytics application to an underlying database from over a computer communications network, the underlying database different from each respective database;
   constructing, in the data analytics application, a data model for underlying data in the underlying database;
   determining, based on the data model, a classification of the underlying data;
   selecting, in the correlation data structure, at least one of the plurality of different pre-constructed queries based on the classification of the underlying data matching the respective classification of the at least one of the plurality of different pre-constructed queries; and
   displaying, in the data analytics application, the selected at least one of the different pre-constructed queries.

2. The method of claim 1, wherein displaying includes displaying a set of directives corresponding to the selected at least one of the plurality of different pre-constructed queries.

3. The method of claim 2, wherein the directives are markup language statements.

4. The method of claim 1, wherein the selection, in the correlation data structure, includes a selection of at least one of the plurality of different pre-constructed queries correlated to a combination of classifications of data in the data model.

5. The method of claim 1, wherein the selection, in the correlation data structure, includes a selection of a user interface view that is a visualization of a portion of the data model.

6. The method of claim 1, wherein the selection, in the correlation data structure, includes a selection of a report of data from a portion of the data model.

7. The method of claim 1, wherein the selection, in the correlation data structure, includes a selection of a programmatic directive in a third-party application.

8. A data analytics data processing system configured for recommending pre-constructed queries, the system comprising:

a host computing platform comprising one or more computers, each with memory and at least one processor;

a database storing therein data;

a data analytics computer program executing in the memory and managing queries against a data model modeling the data stored in the database; and a pre-constructed query recommendation module comprising computer program instructions enabled during execution in the memory of the host computing platform to perform operations comprising:

obtaining a plurality of different pre-constructed queries, each query of the plurality of different pre-constructed queries querying respective data from a respective database, the respective databases different from the database;

for each respective pre-constructed query of the plurality of pre-constructed different queries:

determining a respective classification of the respective data queried from the respective database, the respective classification of the respective queried data representing one or more of a type, a class, or a source for the respective queried data;

determining a respective correlation of the respective query with the respective classification of the respective queried data; and adding, to a correlation data structure, the respective correlation between the respective pre-constructed query and the respective classification of the respective queried data;

establishing a communicative connection by the data analytics computer program to the database from over a computer communications network;

constructing in the data analytics computer program, a data model for the data stored in the database;

determining, based on the data model, a classification of the data stored in the database;

selecting, in the correlation data structure, at least one of the plurality of different pre-constructed queries based on the classification of the data matching the respective classification of the at least one of the plurality of different pre-constructed queries; and displaying, in the data analytics computer program, application, the selected at least one of the different pre-constructed queries.

9. The system of claim 8, wherein displaying includes displaying a set of markup language statements corresponding to the selected at least one of the plurality of different pre-constructed queries.

10. The system of claim 8, wherein the selection, in the correlation data structure, includes a selection of at least one of the plurality of different pre-constructed queries correlated to a combination of classifications of data in the data model.

11. The system of claim 8, wherein the selection, in the correlation data structure, includes a selection of a user interface view that is a visualization of a portion of the data model.

12. The system of claim 8, wherein the selection, in the correlation data structure, includes a selection of a report of data from a portion of the data model.

13. The system of claim 8, wherein the selection, in the correlation data structure, includes a selection of a programmatic directive in a third-party application.

14. A computer program product for recommending pre-constructed queries in data analytics, the computer program product including a computer readable storage medium having program instructions included therewith, the program instructions executable by a device to cause the device to perform a method including:

obtaining a plurality of different pre-constructed queries, each query of the plurality of different pre-constructed queries querying respective data from a respective database;

for each respective pre-constructed query of the plurality of different pre-constructed queries:

determining a respective classification of the respective data queried from the respective database, the respective classification of the respective queried data representing one or more of a type, a class, or a source for the respective queried data;

determining a respective correlation of the respective query with the respective classification of the respective queried data; and adding, to a correlation data structure, the respective correlation between the respective pre-constructed query and the respective classification of the respective queried data;

establishing a communicative connection by a data analytics application to an underlying database from over a computer communications network, the underlying database different from each respective database;

constructing, in the data analytics application, a data model for underlying data in the underlying database;

determining, based on the data model, a classification of the underlying data;

selecting, in the correlation data structure, at least one of the plurality of different pre-constructed queries based on the classification of the underlying data matching the respective classification of the at least one of the plurality of different pre-constructed queries; and displaying, in the data analytics application, the selected at least one of the different pre-constructed queries.

15. The computer program product of claim 14, wherein displaying includes displaying a set of directives corresponding to the selected at least one of the plurality of different pre-constructed queries.

16. The computer program product of claim 15, wherein the directives are markup language statements.

17. The computer program product of claim 14, wherein the selection, in the correlation data structure, includes a selection of at least one of the plurality of different pre-constructed queries correlated to a combination of classifications of data in the data model.

18. The computer program product of claim 14, wherein the selection, in the correlation data structure, includes a selection of a user interface view that is a visualization of a portion of the data model.

19. The computer program product of claim 14, wherein the selection, in the correlation data structure, includes a selection of a report of data from a portion of the data model.

20. The computer program product of claim 14, wherein the selection, in the correlation data structure, includes a selection of a programmatic directive in a third-party application.

* * * * *